United States Patent
Hasselbach (10) Patent No.: US 11,860,311 B2
(45) Date of Patent: *Jan. 2, 2024

(54) OPTICAL SYSTEM HAVING AN IMPROVED ABERRATION BEHAVIOR, AND LIDAR DEVICE INCLUDING A SYSTEM OF THIS TYPE

(71) Applicant: Robert Bosch GmbH, Stuttgart (DE)

(72) Inventor: Juergen Hasselbach, Tamm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 631 days.

This patent is subject to a terminal disclaimer.

(21) Appl. No.: 16/883,040

(22) Filed: May 26, 2020

(65) Prior Publication Data

US 2020/0379091 A1 Dec. 3, 2020

(30) Foreign Application Priority Data

May 29, 2019 (DE) .......................... 102019207867.2

(51) Int. Cl.
| | |
|---|---|
| *G01S 7/481* | (2006.01) |
| *G02B 3/00* | (2006.01) |
| *G02B 26/08* | (2006.01) |
| *G01S 17/02* | (2020.01) |
| *G02B 5/18* | (2006.01) |
| *G01S 17/08* | (2006.01) |
| *G01S 17/42* | (2006.01) |
| *G03B 27/54* | (2006.01) |

(52) U.S. Cl.
CPC ............ *G01S 7/4817* (2013.01); *G01S 7/4811* (2013.01); *G01S 17/02* (2013.01); *G01S 17/08* (2013.01); *G01S 17/42* (2013.01); *G02B 3/0062* (2013.01); *G02B 5/1814* (2013.01); *G02B 26/0875* (2013.01); *G03B 27/54* (2013.01)

(58) Field of Classification Search
CPC .............. G02B 27/0037; G02B 3/0062; G03H 2223/19
See application file for complete search history.

(56) References Cited

U.S. PATENT DOCUMENTS

| | | | | |
|---|---|---|---|---|
| 5,035,486 | A * | 7/1991 | Inokuchi .............. | G02B 3/0068 359/530 |
| 6,169,594 | B1 * | 1/2001 | Aye ........................ | G02B 5/045 349/196 |
| 6,297,907 | B1 * | 10/2001 | Wang ...................... | G02F 1/195 349/196 |
| 11,333,741 | B2 * | 5/2022 | Rembe .................... | G01S 17/88 |

(Continued)

*Primary Examiner* — Yuqing Xiao
*Assistant Examiner* — Zhengqing Qi
(74) *Attorney, Agent, or Firm* — NORTON ROSE FULBRIGHT US LLP; Gerard A. Messina (57) ABSTRACT

An optical system is described, in particular for a LIDAR device, which includes a lens array having a multitude of microlenses and a lens system for deflecting beams out of a scanning area or into the scanning area, the lens system being situated in the beam path between the scanning area and the lens array, the system including at least one wedge array having a multitude of wedge elements situated upstream or downstream from the lens array in the radiation direction, a number of wedge elements equaling a number of microlenses. A LIDAR device is also described.

12 Claims, 10 Drawing Sheets

(56) References Cited

U.S. PATENT DOCUMENTS

| | | | |
|---|---|---|---|
| 2002/0003636 A1* | 1/2002 | Conner | G02B 27/149 |
| | | | 348/E9.027 |
| 2005/0286123 A1* | 12/2005 | Abu-Ageel | G02B 6/136 |
| | | | 359/443 |
| 2007/0181810 A1* | 8/2007 | Tan | G01S 7/4811 |
| | | | 250/341.1 |
| 2010/0214634 A1* | 8/2010 | Kroll | G03H 1/2205 |
| | | | 359/9 |
| 2012/0242960 A1* | 9/2012 | Oiwa | G02B 13/16 |
| | | | 353/31 |
| 2014/0286044 A1* | 9/2014 | Johnson | G02B 5/0278 |
| | | | 362/330 |
| 2016/0076731 A1* | 3/2016 | Mönch | G02B 19/0066 |
| | | | 362/97.1 |
| 2019/0025426 A1* | 1/2019 | Satyan | G02B 27/30 |
| 2019/0064355 A1* | 2/2019 | Pacala | G01S 17/931 |
| 2020/0064522 A1* | 2/2020 | Blasco Claret | G02B 3/0056 |

* cited by examiner

OPTICAL SYSTEM HAVING AN IMPROVED ABERRATION BEHAVIOR, AND LIDAR DEVICE INCLUDING A SYSTEM OF THIS TYPE

CROSS REFERENCE

The present application claims the benefit under 35 U.S.C. § 119 of German Patent Application No. DE 102019207867.2 filed on May 29, 2019, which is expressly incorporated herein by reference in its entirety.

FIELD

The present invention relates to an optical system, in particular for a LIDAR device, which includes a lens array having a multitude of microlenses, and a lens system for deflecting beams out of a scanning area or into the scanning area, the lens system being situated in the beam path between the scanning area and the lens array. The present invention also relates to a LIDAR device.

BACKGROUND INFORMATION

Conventional LIDAR devices may be designed as laser scanning systems. Systems of this type often generate a beam expansion on the transmission side, using microoptical elements. This takes place without an angle loss of the field of view or of the scanning area. This beam expansion is used to increase the system robustness against local contamination of the transmitting and/or receiving lens, on the one hand, and the beam expansion is used to increase eye safety and the ability to emit more light power, on the other hand.

One problem with LIDAR devices of this type is, however, the fact that, during the transmission-side scanning on microlens elements at a distance from the optical axis, differently sized areas of the transmission signal are deflected directly into the aperture of the transceiver lens, depending on the design of the expanded transmission beam diameter and the distance of an impacted microlens element from the optical axis. These "cut-off" parts thus no longer reach the scanning area, whereby differently sized gaps or shadings may arise in the target distance of the measuring range between adjacent spots, depending on the scanning angle.

SUMMARY

An object of the present invention includes providing a LIDAR device and an optical system which may use a complete field angle of a lens system without a spot shading for scanning the scanning area and which may minimize aberrations.

This object may achieved with the aid of example embodiments of the present invention. Advantageous embodiments of the present invention are described herein.

According to one aspect of the present invention, an example optical system is provided, in particular for a LIDAR device. The optical system includes a lens array, which has a multitude of microlenses, and a lens system for deflecting beams out of a scanning area or into the scanning area. The lens system is preferably situated in the beam path between the scanning area and the lens array. The system furthermore includes at least one wedge array situated upstream or downstream from the lens array in the radiation direction, which has a multitude of wedge elements. A number of wedge elements preferably equals a number of microlenses.

According to a further aspect of the present invention, an example LIDAR device is provided for generating beams and for scanning a scanning area using the beams. The LIDAR device includes a transmission unit for generating beams and for deflecting the beams along the scanning area, and a receiving unit, which includes at least one detector, for receiving reflected beams. The transmission unit and/or the receiving unit include(s) an optical system according to the present invention.

The lens system may be made up of one or multiple lenses. In addition, the objective may have an aperture which is integrated into or situated on the lens system for limiting a maximum exit surface.

Due to the combined use of the lens array and the wedge array, the beams may be influenced in such a way that a so-called spot section or a spot shading of the beams no longer occurs in the edge area of the lens system. One advantage is that both the portion of both the transmission signal and the receive signal, which would be radiated into the aperture of the lens system without this optical system, may be deflected and pass through the lens system.

This optical function may be implemented, for example, by a wedge array situated as a wedge structure on a back side or in front of the back side of the lens array used. Alternatively or additionally, the optical function may be implemented by an optical grid or a diffractive or also a holographic optical element.

By using a lens array which additionally includes a downstream or integrated wedge array, an edge area of the transmission spot may be deflected by a suitable wedge angle or an optical grid, whereby the spot or the beams are no longer radiated into the aperture of the lens system. The spot is deflected in such a way that it is still able to pass through the light-permeable area of the lens system. Directly after the passing through the lens system, the spot areas influenced and not influenced by the wedge array or the diffractive optical element may be superimposed on each other. However, these spot areas once again precisely form the desired beam diameter in the target distance of the area to be detected or the scanning area. The entire field angle of the lens system may therefore be used for scanning the scanning area without a transmitter-side spot section. In particular, a more efficient utilization of the transmission power may be implemented hereby. Alternatively or additionally, the transmission spots may also be deflected out of the lens system, offset at an angle from an optical axis. At an intended target distance, the desired spot position may be reached again hereby, a superimposition of the beams being simultaneously avoided.

The optical system may preferably be used in a LIDAR device on the transmission side and/or the reception side.

The combination of the lens array with the wedge array of the optical system may preferably be used to optimize an aberration behavior of the optical system. For this purpose, for example, the microlenses of the lens array may be rotated with respect to the wedge elements of the wedge array, or the wedge elements may be situated downstream from the microlenses in the radiation direction of the beams. An exit angle of the generated beams may remain essentially unchanged, despite this measure.

According to one specific embodiment of the present invention, the wedge array is designed as a diffractive or holographic optical element, which is mounted on the lens array at least on one side or is situated at a distance from the lens array in the beam path of the beams. This measure may be used to prevent a spot section on both the transmission and the reception sides. An optical function of this type may be implemented, for example, with the aid of a diffractive optical element. Instead of an optical or conventional wedge array, an optical grid array may be used, which deflects the transmit or receive beam onto the desired angle.

According to another exemplary embodiment of the present invention, the wedge elements of the wedge array have a triangular cross section with an inclined surface and a planar surface, the planar surface of the wedge element facing a planar surface of a microlens. A particularly advantageous aberration behavior of the optical system may be implemented hereby, if the wedge elements are situated downstream from the microlenses in the radiation direction of the beams out of a LIDAR device including an optical system of this type. The generated beams must thus pass the microlenses in a first step and may then be additionally corrected or deflected by the wedge elements. The aberrations of the optical system may be minimized hereby.

The at least one surface of the wedge array is preferably oriented radially away from an axis of symmetry and from the lens or the lens array. The wedge array may be oriented directly onto the incoming beams hereby. The incoming beams may be the beams generated by the transmission unit or the beams that are reflected or backscattered in the scanning area.

According to a further specific embodiment of the present invention, the at least one wedge element has a height which is equal to the height of the at least one microlens or is less than the height of the at least one microlens. A portion of the beams may be deflected hereby, or all beams may be deflected by the particular wedge elements illuminating the microlenses. In particular, this results in a greater flexibility and design freedom when constructing the optical system.

The height of the particular wedge structures or wedge elements may correspond to the utilized pitch of the microlenses. In particular, the height may be designed to be constant or variable along an extension of the wedge array, depending on the design of the optical system. Due to the angle of incidence of the signal becoming ever steeper, because of the distance from the optical axis, the wedge angles must be adapted accordingly. The distance between the wedges or the surfaces themselves also increases as the distance from the optical axis grows. The entire structure may be advantageously designed to be radially symmetrical with respect to the optical axis or to the axis of symmetry.

According to a further specific embodiment of the present invention, the wedge array is situated at a distance from the lens array in the radiation direction or is connected to the lens array. The influence of the optical element on the radiation may be adapted hereby due to the distance from the lens, in addition to the design of the wedge-shaped sections or surfaces. In particular, a separate optical element may be designed as a retrofit approach and be installable in LIDAR devices already in operation at a later time.

According to a further exemplary embodiment of the present invention, the wedge array is designed to be integral with the lens array. Alternatively, the wedge array may be fixedly joined to the lens array. In particular, the wedge array or the wedge elements may be mounted on a back side of the lens array, so that the usually planar surface of the lens array is designed as a wedge array. A compact array or optical element equipped with optical functions on both sides may thus be provided, which is optimally adaptable to a field angle of the lens system.

According to a further exemplary embodiment of the present invention, at least one microlens of the lens array is inclined around a rotation angle with respect to at least one wedge element of the wedge array. The beams deflected by the wedge element may hereby strike the flat surface of the particular microlens at a right angle, whereby the occurrence of aberrations, in particular, may be minimized. One wedge element may preferably be assigned to each microlens. An optical element may thus be provided, which has an equal number of microlenses and wedge elements.

According to one advantageous specific embodiment of the present invention, each microlens of the lens array has a separate rotation angle. A system may be implemented hereby, in which the exit angle of the beams through the lens system in the scanning area corresponds to an angle without wedge elements. The exit angle of the beams is thus not influenced by the use of the wedge array.

To be able to orient the particular focal points of the microlenses onto the focal plane of the lens system, despite the rotation of the individual microlens elements, a concave design of the entire lens array or microlens array is advantageous. The space requirements between the lens system and the wedge array as well as the microlens array may be minimized hereby.

According to a further exemplary embodiment of the present invention, the rotation angle of the at least one microlens corresponds to a deflection angle of the at least one wedge element, which is assigned to the at least one microlens. The rotation angle of the at least one microlens may preferably vary for each individual microlens element and focuses on the radial distance from the optical axis. For example, the rotation angle as well as the deflection angle may be selected to be greater as the radial distance from the optical axis increases. The exit angle of the beams may be varied on the focal plane of the lens system via the selected rotation center or the optical axis.

The optical system may preferably be used in automotive LIDAR systems, in the consumer sector, in construction, in the trades sector, in trains, in drones, in industry, for example the automation technology, in a manufacturing environment and the like.

Preferred exemplary embodiments of the present invention are explained in greater detail below, based on highly simplified schematic representations in the figures.

DETAILED DESCRIPTION OF EXAMPLE EMBODIMENTS

Figure 1:
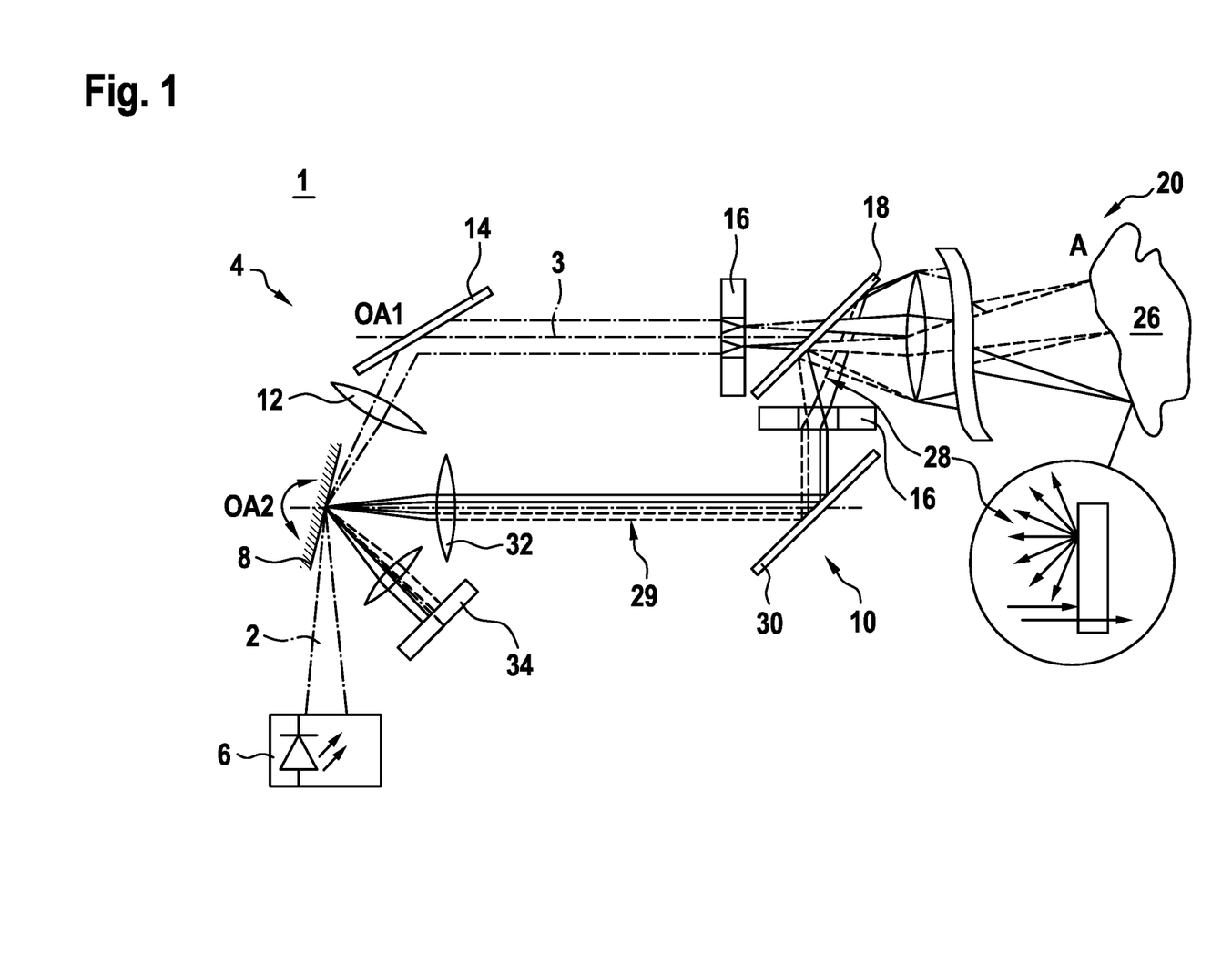
FIG. 1 shows a schematic representation of a LIDAR device according to one exemplary embodiment of the present invention.

FIG. 1 shows a schematic representation of a LIDAR device 1 according to one exemplary embodiment of the present invention. LIDAR device 1 is used to generate beams 2 and to scan a scanning area A using beams 2. LIDAR device 1 includes a transmission unit 4, which includes a laser 6 as the radiation source for generating beams 2.

Generated beams 2 are successively deflected via a movable mirror 8 of transmission unit 4. Movable mirror 8 may be designed as a pivotable micromirror and periodically oscillate, by which scanning area A is scanned. Mirror 8 is used by transmission unit 4 together with a receiving unit 10.

Beams 2 deflected by mirror 8 are bundled or preferably formed in parallel by a collimator lens 12 and deflected transversely to the radiation direction of laser 6 by a deflection mirror 14. Deflected beams 3 are emitted onto an optical system 16 along a first optical axis OA1.

Optical system 16 includes a microlens array 17 and is described in greater detail below. Optical system 16 acts upon beams 3 before they are deflected onto a beam splitter 18 and onto optical transmitting system 20. Optical transmitting system 20 is used to emit beams 3 into scanning area A.

According to the exemplary embodiment, optical transmitting system 20 is designed as a combined optical transceiver system 20 and is also used by receiving unit 10. Optical transceiver system 20 includes a lens system 22 and an aperture 24. Lens system 22 may also be designed as part of optical system 16. Depending on the design of LIDAR device 1, in particular, only one optical system 16 may be provided, which is usable for generated beams 3 and received beams 28 alike.

Backscattered or reflected beams 28 are received by optical transceiver system 20 in scanning area A, for example on an object 26, and deflected onto optical system 16 of receiving unit 10 via beam splitter 18. The optical system of receiving unit 10 and transmission unit 4 may be provided with the same or different designs.

After passing optical system 16, beams 28 are deflected onto a deflection mirror 30. The deflected beams are deflected onto a second optical axis OA2 by deflection mirror 30, second optical axis OA2 being able to run in parallel to first optical axis OA1. Deflected beams 28 are again deflected onto a detector 34 via a focusing lens 32 and via pivotable mirror 8.

Transmission beam 2, 3 are scanned via optical system 16 with the aid of the movement of mirror 8 and its alternating movement. A divergent transmission beam is then projected onto optical transceiver system 20 by each microlens element of lens array 17 before it may, in an expanded manner, exit LIDAR device 1 into scanning area A. After being reflected/scattered on an object 26 situated in field A, signal 28 again passes through optical transceiver system 20 and is deflected onto detector 34 via the optical elements described above.

Figure 2:
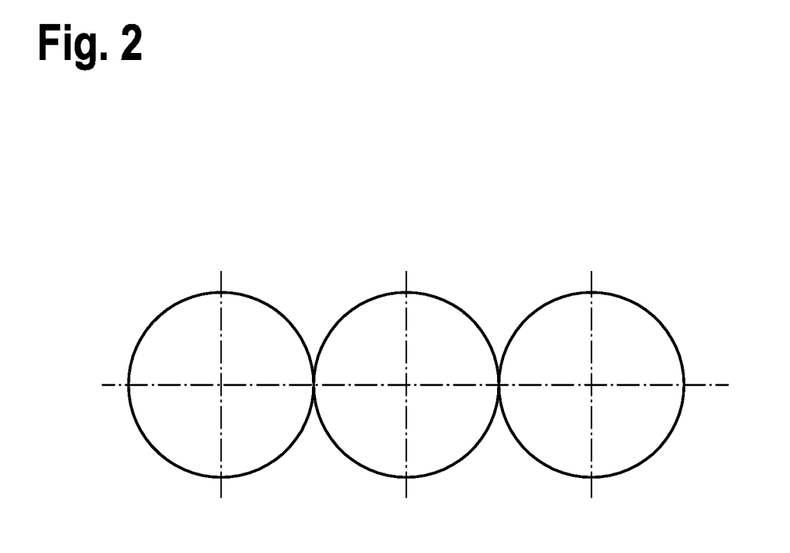
FIGS. 2 and 3 show schematic representations of setpoint and actual transmission spot arrangements at a target distance in the scanning area.
Figure 3:
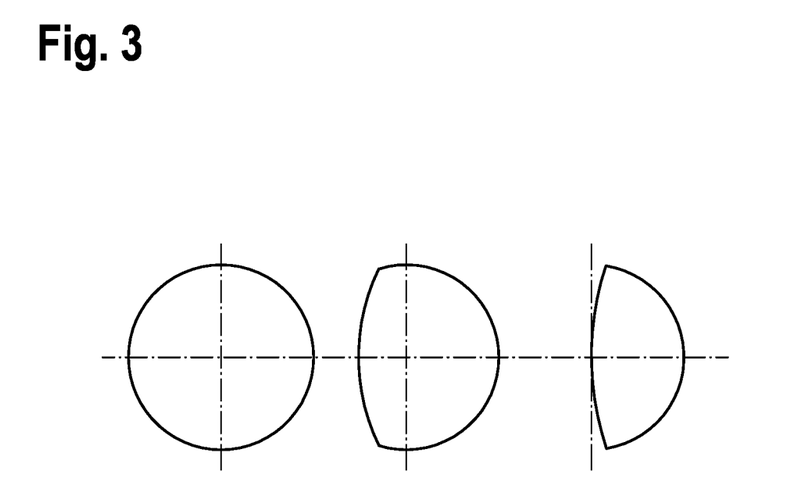
Figure 4:
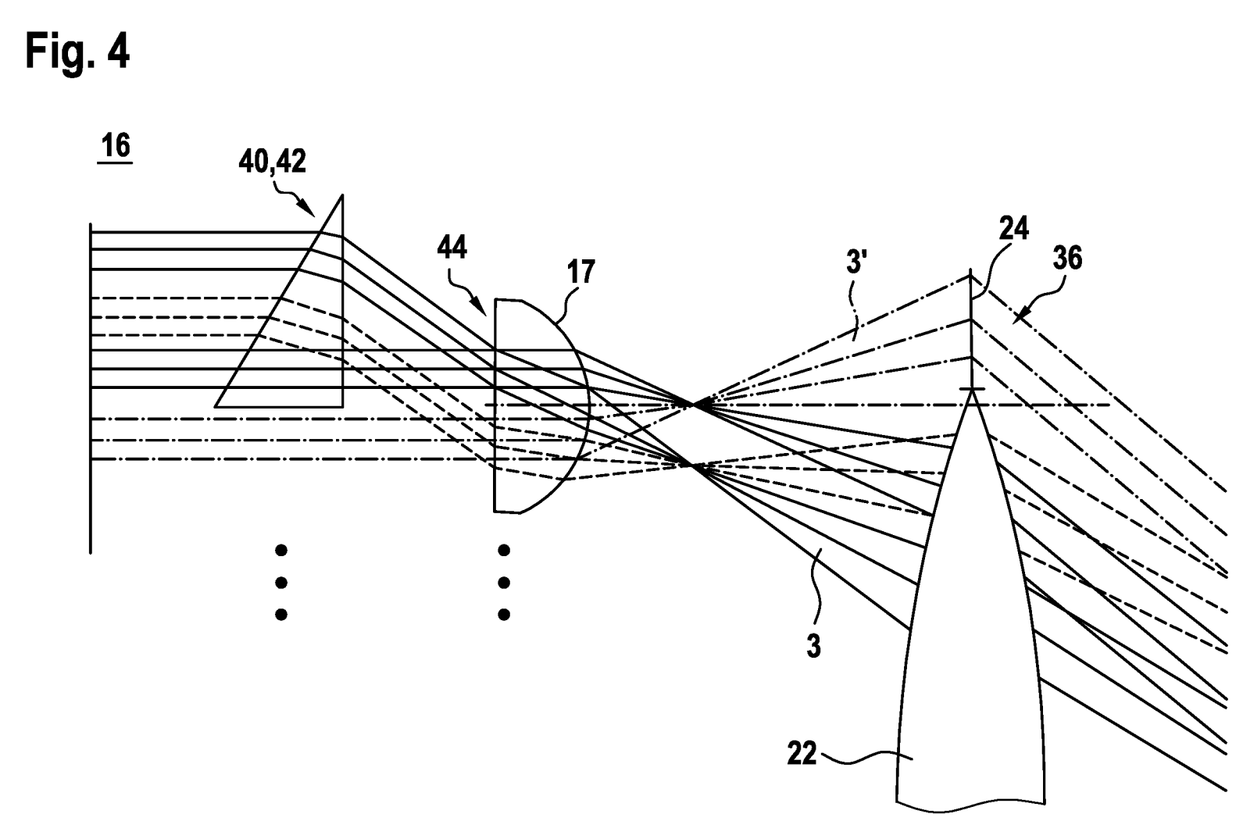
FIG. 4 shows a detailed view of an optical system according to one specific embodiment of the present invention.

FIG. 2 and FIG. 3 illustrate schematic representations of a setpoint and actual transmission spot system at a target distance in scanning area A to clarify the problem in the related art. FIG. 2 shows three different setpoint spot arrangements. The effective actual spot arrangements illustrated in FIG. 2 are shown in FIG. 3. An inherent problem with the usual scanner systems is the fact that, during the transmission-side scanning on microlens elements aside from the optical axis, differently sized areas of the transmission signal are deflected directly into aperture 24 of the transceiver lens, depending on the design of the expanded transmission beam diameter and the distance of an impacted microlens element from the optical axis. This is illustrated in FIG. 4. These "cut-off" parts 36 thus no longer reach scanning area A or lens system 22 of optical transceiver system 20, by which gaps of different sizes occur in the target distance of the measuring area between adjacent spots, depending on the scanning angle of mirror 8. The "cut off" spots are illustrated in FIG. 3 on a left side.

This means that the full field angle of lens system 22 used may never be utilized without a spot section 36 occurring of no more than half the original diameter.

Depending on the diameter of expanded transmission beam 3, transmission beam 3 is cut off by aperture 24 of optical transceiver system 20, starting at a certain microlens height with respect to optical axis OA1. The distance of a microlens element 17 from optical axis OA1 is translated into a deflection angle in the field (field angle, FoV). The larger the transmission beam diameter, the smaller the field angle at which the full diameter of transmission spot 3 has already been cut.

FIG. 4 shows a detailed view of an optical system 16 according to one exemplary embodiment of the present invention. A wedge element 42 of a wedge array 40 is illustrated, which is not integrated into microlens 17 of a microlens array but is situated at a distance from particular microlens 17. For the sake of simplicity, only one wedge element 42 and one microlens 17, which are part of an optical system 16, are illustrated in FIG. 4. However, optical system 16 includes a multitude of wedge elements 42 and microlenses 17, which are each arranged over a wide area as arrays. In particular, an optical function of optical system 16 with and without wedge element 42 is illustrated. The beam path through a microlens 17 and downstream lens system 22 on the transmission and reception sides is illustrated. In particular, beam paths are shown in a comparison between beams 3' without wedge element 42 and beams 3 with wedge element 42.

Not only a part of signal 3 incident through microlenses 17 is deflected at an angle in such a way that it does not strike objective aperture 24, but rather entire signal 3.

Signal 3 is deflected through wedge element 42 onto lens system 22 on the transmission side with the aid of an angle difference, whereby it strikes lens system 22 and not objective aperture 24 in a different position. The angle difference is selected in such a way that the beams or the transmission signal illuminate the same object point in the target distance of detection space A.

LIDAR device 1 is thus also able to recapture light 28 backscattered by illuminated object point 26 at the same angle without any spot section 36 and to deflect it in an axis-parallel manner downstream from wedge array 40 in the direction of detector 34.

Figure 5:
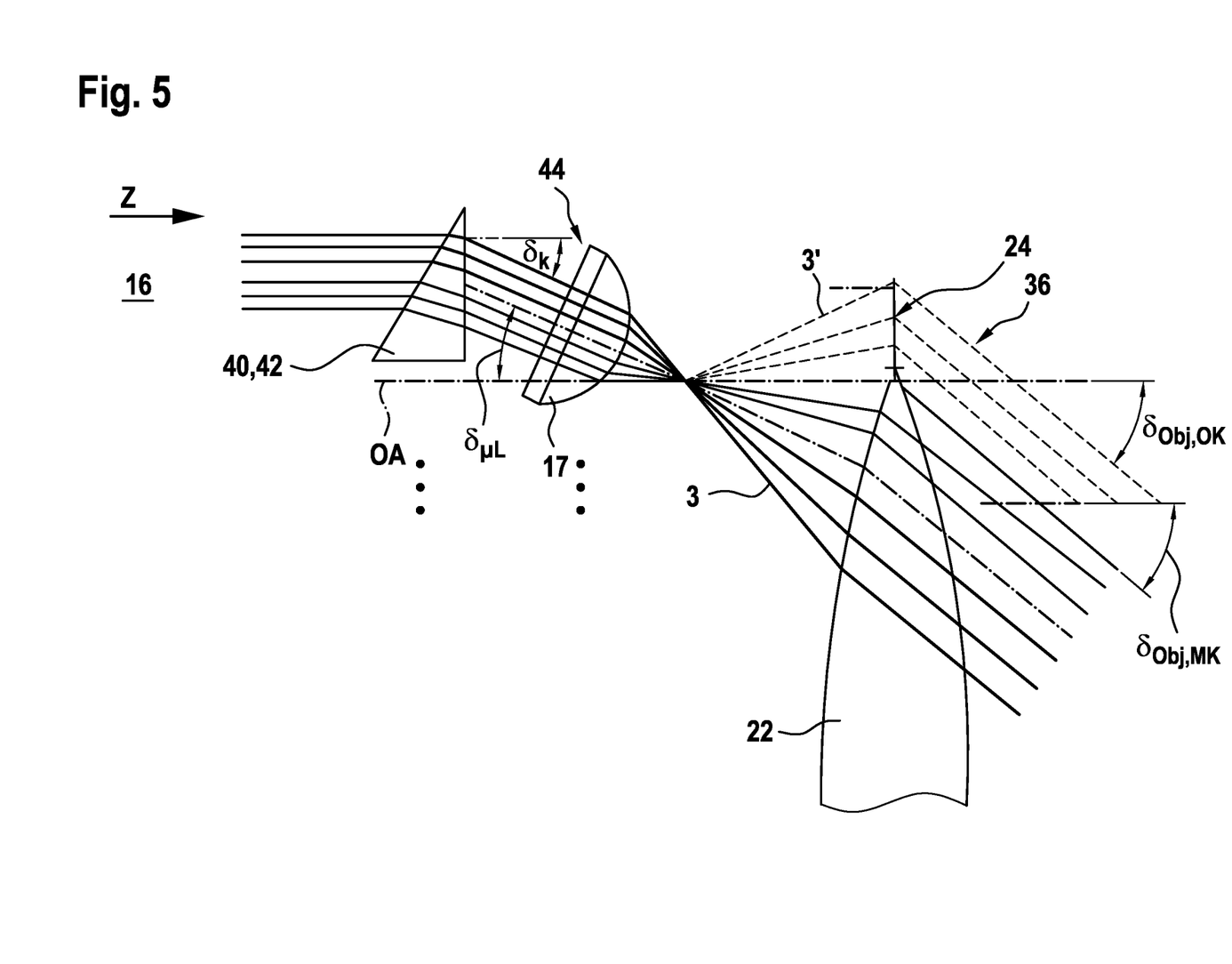
FIG. 5 shows a detailed view of an optical system according to a further specific embodiment of the present invention.

FIG. 5 shows a detailed view of an optical system 16 according to a further exemplary embodiment of the present invention. In contrast to FIG. 4, beams 3 in optical system 16 do not strike microlens 17 in parallel to optical axis OA1, due to the beam deflection of wedge element 42 around angle $\delta_K$. The occurrence of aberrations, in particular astigmatisms, may be avoided hereby. These mapping errors result in the fact that the mapping quality of emitted beam 3 in scanning area A deteriorates, and no defined spot may be projected at an increasing object distance. The consequence is a significant reduction in the system range and the system angle resolution.

Figure 6:
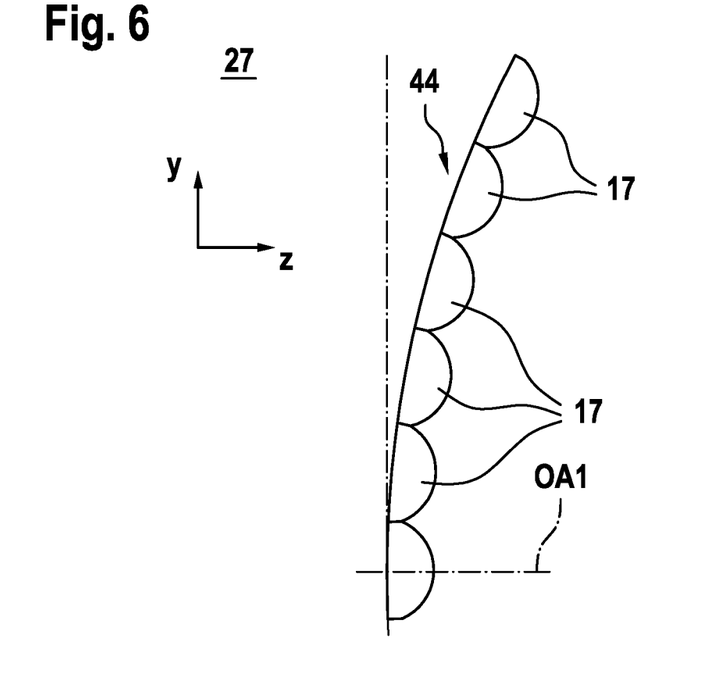
FIG. 6 shows a sectional representation of a microlens array.

In optical system 16 including the wedge element/microlens combination, the problem of the mapping errors may be eliminated by rotating particular microlens 17. Rotation angle $\delta_{\mu L}$ of microlens 17 always corresponds to deflection angle $\delta_K$ of wedge element 42. This rotation angle $\delta_{\mu L}$ may vary for each individual wedge element 42 or each individual microlens 17 and focuses on the radial distance from optical axis OA1 (FIG. 6). Exit angle $\delta_{Obj,MK}$ of the beams may be varied on the focal plane of lens system 22 via the selected rotation center. For illustrative purposes, an exit angle $\delta_{Obj,MK}$ including a wedge element 42 and an exit angle $\delta_{Obj,OK}$ without a wedge element 42 of beams 3 are illustrated.

According to the illustrated exemplary embodiment, beams 3, 3' are deflected onto optical system 16 in radiation direction Z.

Figure 7:
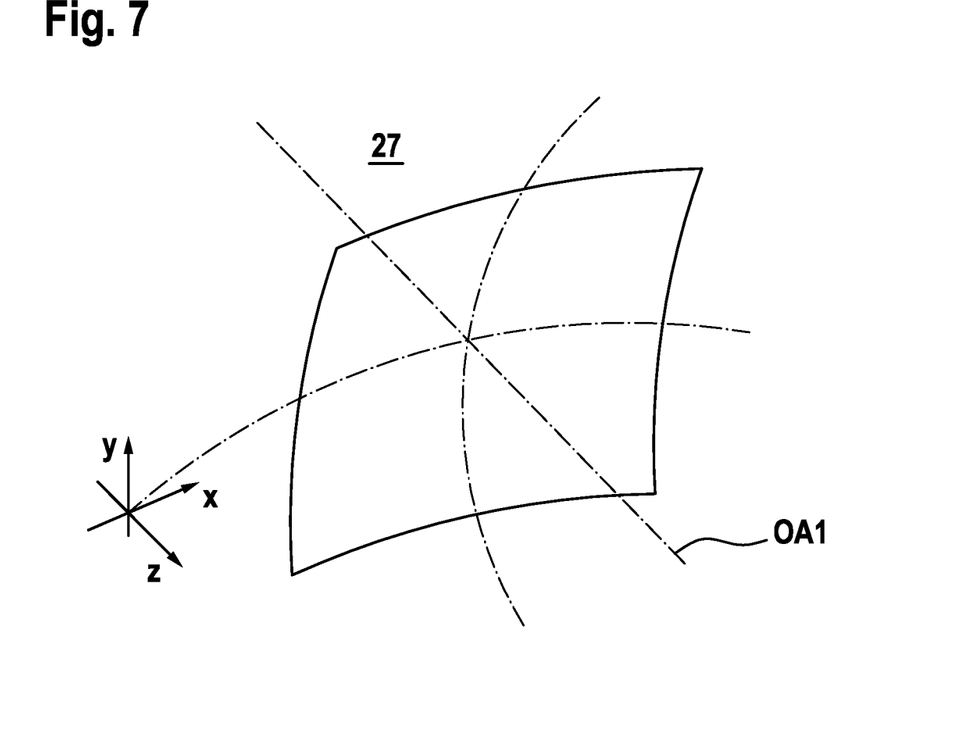
FIG. 7 shows a perspective representation of the microlens array from FIG. 6.
Figure 8:
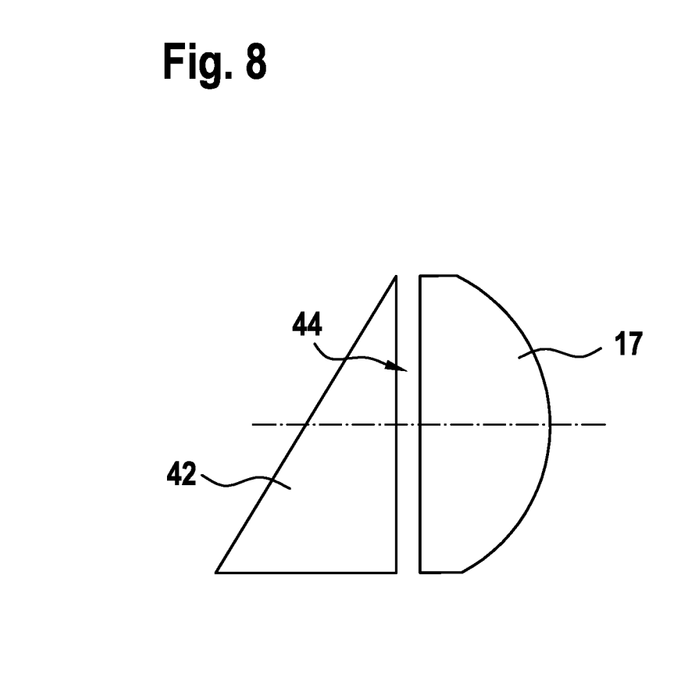
FIGS. 8 through 17 show schematic representations of microlenses including wedge elements of an optical system in accordance with an example embodiment of the present invention.
Figure 9:
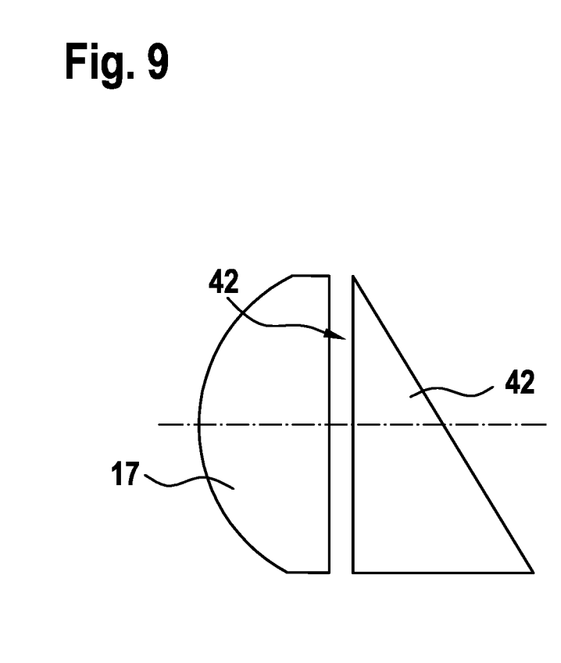
Figure 10:
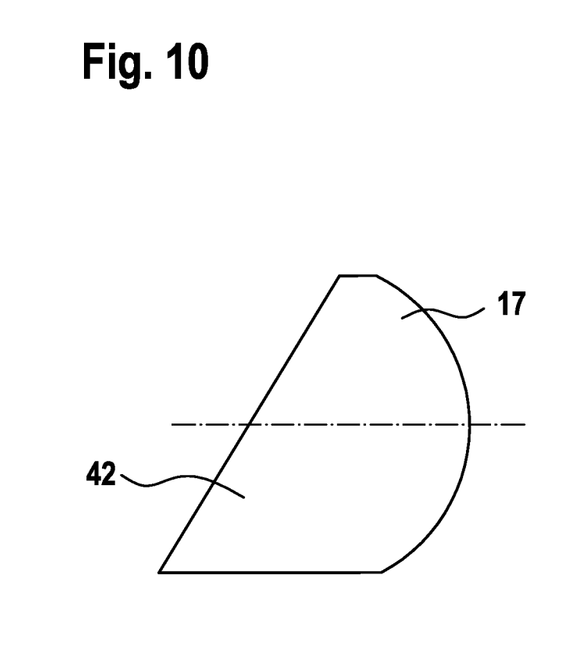
Figure 11:
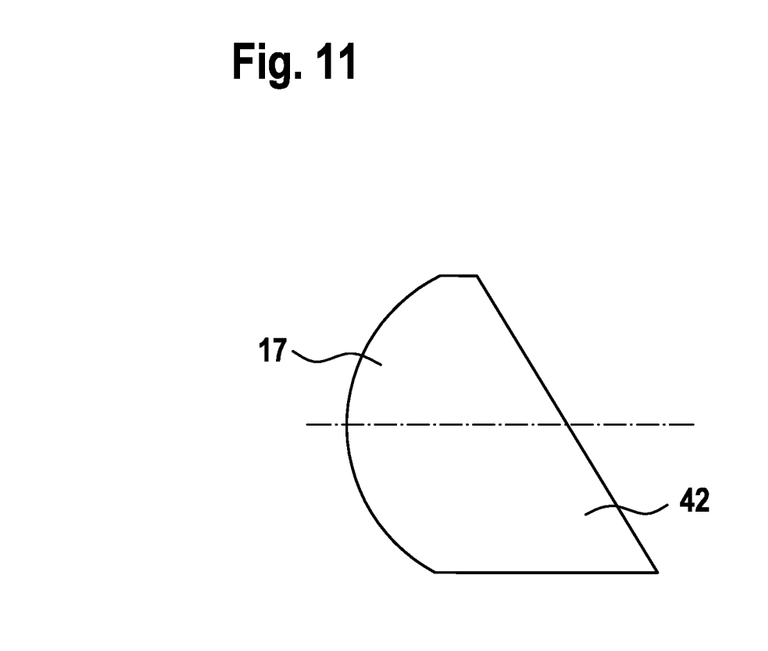
Figure 12:
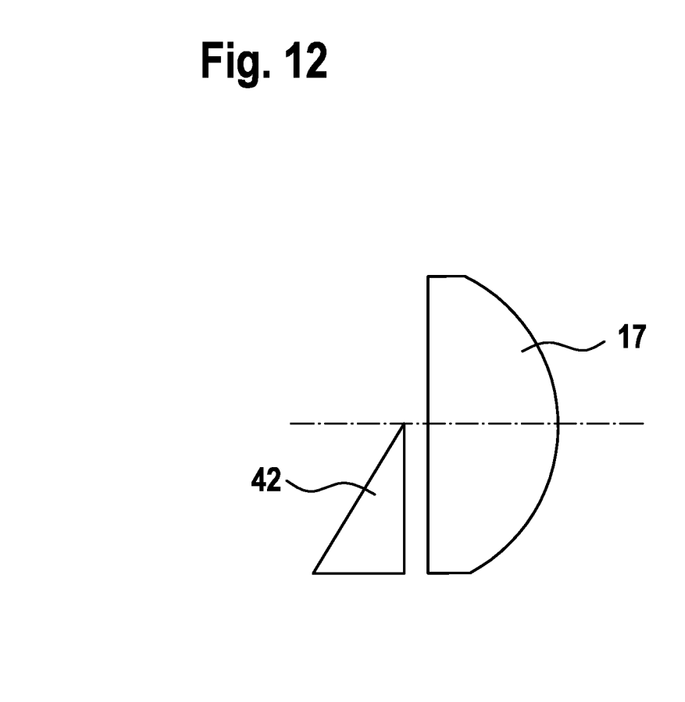
Figure 13:
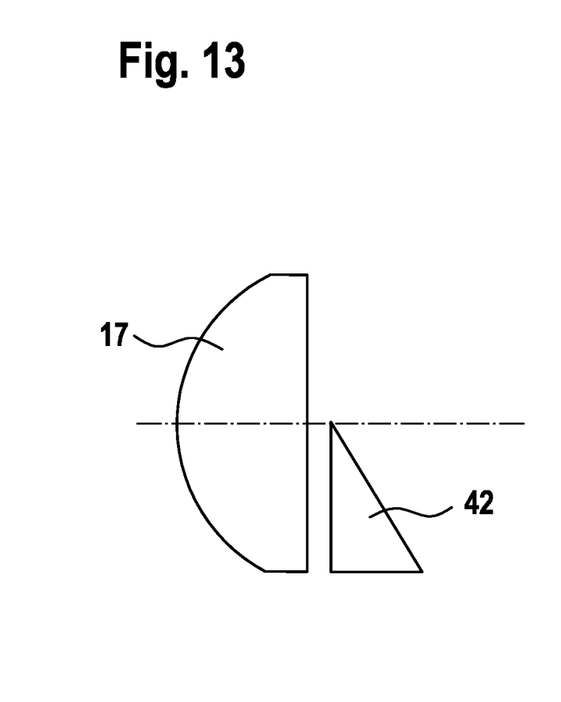
Figure 14:
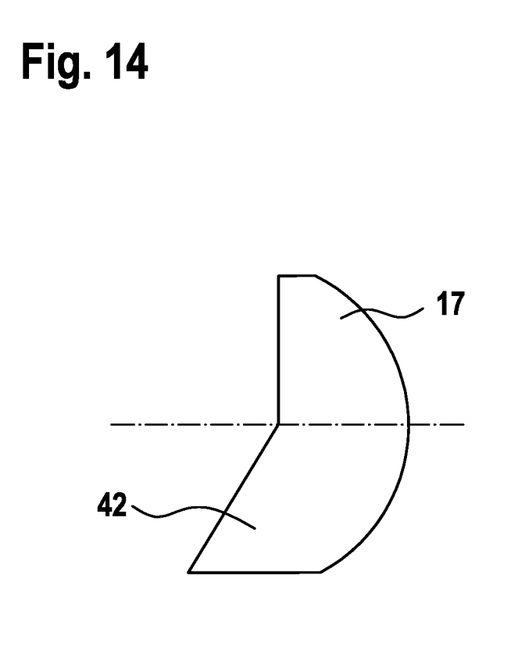
Figure 15:
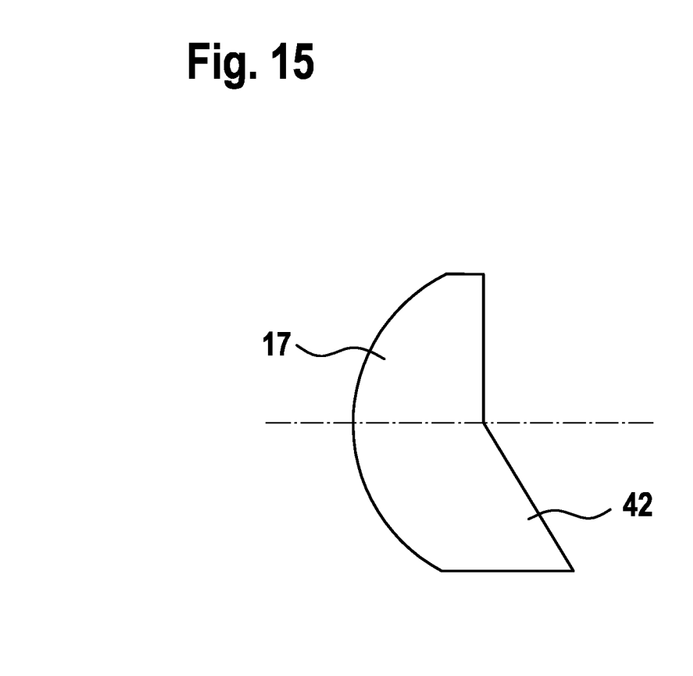

FIG. 6 and FIG. 7 show representations of a microlens array 27. To be able to place the particular focal points on the focal plane of lens system 22, despite a rotation of individual microlenses 17, a concave design of entire lens array 27 is necessary. The distance between lens system 22 and microlens array 27 may be minimized hereby. To illustrate the dome shape of microlens array 27, microlenses 27 are not shown in FIG. 7.

Depending on a distance from optical axis OA1, particular microlenses 27 have a different rotation angle $\delta_{\mu L}$ in the x-direction and/or y-direction. In particular, a larger rotation angle $\delta_{\mu L}$ may be selected as the distance increases.

Schematic representations of microlenses 17, including corresponding wedge elements 42 of an optical system 16, are illustrated in FIGS. 8 through 17. In particular, different designs of the individual element combinations are shown.

FIGS. 8, 10, 12, 14 show designs, in which first wedge element 42 and then microlens 17 are connected in radiation direction Z. Wedge elements 42 may be situated at a distance from particular microlens 17, or they may be integrally connected to particular microlens 17. Since the beams deflected by wedge elements 42 strike flat surfaces 44 of microlenses 17 at an angle, aberrations may arise, since the beam deflection by wedge element 40 around angle $\delta_K$ takes place only downstream from microlens 17.

FIGS. 9, 11, 13, 15, as opposed to FIGS. 8, 10, 12, 14, show mirror-inverted arrangements of microlenses 17 and wedge elements 42. First a microlens 17 and then a wedge element 42 are thus situated in radiation direction Z. Microlenses 17 are arranged in such a way that flat surface 44 is facing the incoming beams from radiation direction Z. As a result, one incident beam 3 may be maintained in parallel to optical axis OA for each microlens 17. This may be implemented without rotating particular microlenses 17. Since microlens array 27 may thus have a flat or plate-shaped design, the use of standard components is possible.

Figure 16:
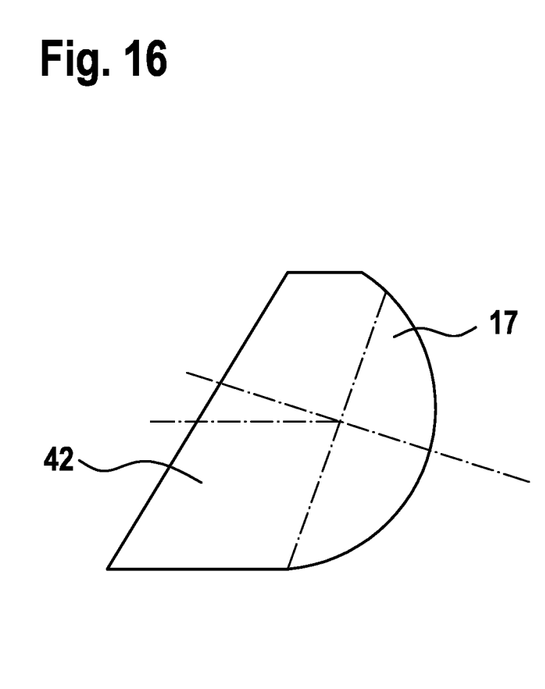
Figure 17:
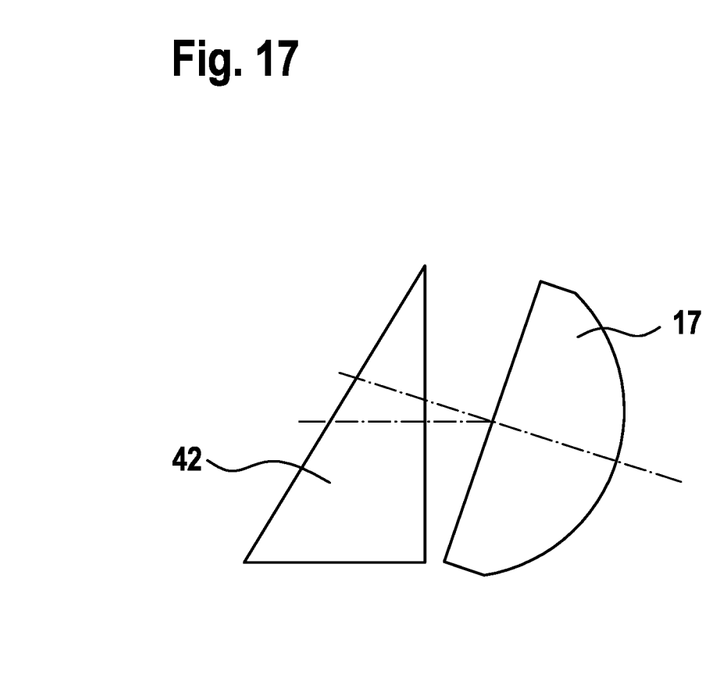

Although the arrangement of microlenses 17 and wedge elements 42 in FIGS. 16 and 17 is similar to that in FIGS. 8, 10, 12, 14, a rotation of microlenses 17 with respect to wedge elements 42 is provided, whereby the installation space requirements and the occurrence of aberrations are minimized.

What is claimed is:

1. An optical system for a LIDAR device, comprising:
a lens array including a multitude of convex microlenses on a single shared substrate, each of the convex microlenses having a flat surface and a convex surface, wherein an entirety of the lens array is shaped in a concave shape and the multitude of convex lenses includes at least six convex microlenses;
a lens system configured to deflect beams out of a scanning area or into the scanning area, the lens system being situated in a beam path of the beams between the scanning area and the lens array; and
at least one wedge array situated upstream from the lens array in a radiation direction, the wedge array including a multitude of wedge elements, each of the wedge elements having a triangular cross section, a number of wedge elements equaling a number of the convex microlenses, each respective wedge element of the wedge elements being configured to receive radiation and to deflect the radiation onto the flat surface of a different respective convex microlens of the convex microlenses;
wherein the lens array has an optical axis, wherein each convex microlens of the lens array has a separate rotation angle, and wherein the rotation angles of the convex microlenses of the lens array that are a greater distance from the optical axis are greater than the rotation angles of the convex microlenses of the lens array that are at a smaller distance from the optical axis, wherein the rotation angle of each convex microlens is a rotation angle with respect to its respective wedge element.

2. The system as recited in claim 1, wherein the wedge array is mounted on the lens array at least on one side or is situated at a distance from the lens array in the beam path of the beams.

3. The system as recited in claim 1, wherein the wedge elements of the wedge array each have an inclined surface and a planar surface, the planar surface each of the wedge elements facing a flat surface of one of the convex microlenses.

4. The system as recited in claim 3, wherein at least one of the wedge elements has a height, which is equal to a height of at least one of the convex microlenses or is less than the height of the at least one of the convex microlenses.

5. The system as recited in claim 1, wherein the wedge array is situated at a distance from the lens array in the radiation direction or is connected to the lens array.

6. The system as recited in claim 1, wherein the wedge array is integral with the lens array.

7. The system as recited in claim 1, wherein the rotation angle of at least one of the convex microlenses corresponds to a deflection angle of at least one of the wedge elements which is assigned to the at least one of the convex microlenses.

8. The system as recited in claim 1, wherein the lens system is configured to deflect the beams into the scanning area, and the lens array is between the wedge array and the lens system.

9. The system as recited in claim 8, wherein the lens system has an optical aperture, and the wedge array together with the lens array are arranged to deflect the radiation onto the lens system but not through the optical aperture.

10. A LIDAR device for scanning a scanning area using beams, comprising:
a transmission unit configured to generate the beams and to deflect the beams along the scanning area; and
a receiving unit, which includes at least one detector, configured to receive reflected beams;
wherein the transmission unit and/or the receiving unit includes an optical system including:
a lens array including a multitude of convex microlenses on a single shared substrate, each of the convex microlenses having a flat surface and a convex surface, wherein an entirety of the lens array is shaped in a concave shape and the multitude of convex microlenses includes at least six convex microlenses;

a lens system configured to deflect beams out of the scanning area or into the scanning area, the lens system being situated in a beam path of the beams between the scanning area and the lens array; and at least one wedge array situated upstream from the lens array in a radiation direction, the wedge array including a multitude of wedge elements each having a triangular cross section with an inclined surface and a planar surface, a number of wedge elements equaling a number of convex microlenses, each respective wedge element of the wedge elements being configured to receive radiation and to deflect the radiation onto the flat surface of a different respective convex microlens of the convex microlenses;

wherein the lens array has an optical axis, wherein each convex microlens of the lens array has a separate rotation angle, and wherein the rotation angles of the convex microlenses of the lens array that are at a greater distance from the optical axis are greater than the rotation angles of the convex microlenses of the lens array that are at a smaller distance from the optical axis, wherein the rotation angle of each convex microlens is a rotation angle with respect to its respective wedge element.

11. The LIDAR device as recited in claim 10, wherein the lens system is configured to deflect the beams into the scanning area, and the lens array is between the wedge array and the lens system.

12. The LIDAR device as recited in claim 11, wherein the lens system has an optical aperture, and the wedge array together with the lens array are arranged to deflect the radiation onto the lens system but not through the optical aperture.

* * * * *